Nov. 9, 1965 P. EYZAT 3,216,407
INJECTION DEVICE, PARTICULARLY ADAPTED FOR CARRYING OUT
THE DOUBLE INJECTION METHOD IN
INTERNAL COMBUSTION ENGINES
Filed May 6, 1963 2 Sheets-Sheet 1

INVENTOR
PIERRE EYZAT

BY Toulmin & Toulmin

ATTORNEYS 3,216,407
INJECTION DEVICE, PARTICULARLY ADAPTED FOR CARRYING OUT THE DOUBLE INJECTION METHOD IN INTERNAL COMBUSTION ENGINES
Pierre Eyzat, Aulnay-sous-Bois, France, assignor to Institut Francais du Pétrole, des Carburants et Lubrifiants, Seine-et-Oise, France
Filed May 6, 1963, Ser. No. 278,155
Claims priority, application France, May 9, 1962, 897,045
6 Claims. (Cl. 123—32)

This invention relates to a new and simple device for carrying out improvements in the operation of internal combustion engines of the compression-ignition type and particularly for operating such engines by means of the double-injection method.

It has been already established in the U.S. Patent 2,960,079, assigned to the same assignee as the present application, that considerable advantages such as a smoother combustion regardless of the type of fuel employed and an increased power output at a given rate of pressure increase are obtained by a new method of double injection. According to this method a first "carburating" fraction of the fuel charge is injected into the hot residual gases remaining in the combustion space of the cylinder toward the end of the exhaust stroke of a work cycle and a second "igniting" fraction corresponding to the remainder of the fuel charge is injected toward the end of the compression stroke of the next work cycle.

Such conditions are fulfilled, for instance, if the timing of the first "carburating" fraction and that of the main "igniting" injection are chosen in such a way that the interval between these two successive injections into the same cylinder corresponds to one complete revolution (360°) of the crankshaft in the case of a four-stroke engine.

Various feeding devices may be used for carrying out the double-injection method. For instance, two injection pumps, each having the same number of cylinders as the engine, can be employed for adjusting at will, and as a function of the type of fuel used, the ratio of fuel amounts introduced, respectively, by the first "carburating" injection and the second "igniting" injection.

However, this arrangement, as described in the U.S. patent, supra, suffers from the drawback of being too expensive and of requiring important and complicated changes in the engine structure, due to the use of two pumps instead of only one pump. Another solution for operating a combustion engine according to the double injection method and which is described in the U.S. patent, supra, consists in providing an appropriate camshaft for a single injection pump. However, according to that solution the ratio in the respective amounts of fuel injected as a first, "carburating" portion and as a second "igniting" portion cannot be adjusted in a particular engine to different types of fuel for operating the engine.

Still another arrangement, which is described in U.S. Patent 3,014,466 assigned to the same assignee as the present application, provides more simple means for carrying out the double-injection method with the known engines without requiring substantial modification of the latter. It is applicable to conventional engines having an even number of cylinders and fed by means of any conventional pump such as for instance that of the usual type having the same number of cylinders as the engine, a rotary pump, a pump provided with a rotary distributor or a pump with one or more cylinders each supplying the fuel in successive order to a number of delivery pipes, for instance by rotation of the piston, the type of the pump being not critical.

This arrangement essentially consists of associating to each other by pairs each two delivery pipes fed by the pump at an interval of a half cycle relative to each other, through a junction pipe comprising discharge-reducing means such as for instance calibrated section-limiting means. However, this latter arrangement suffers from a number of drawbacks particularly in connection with certain types of use.

Thus, in the case where a slight difference occurs between the respective pressures to which are operated the two associated injectors, the distribution of the charge between the two injections becomes irregular.

Another disadvantage of this arrangement, which is particularly important where operating an engine of the type comprising a precombustion chamber is that this arrangement cannot provide means for maintaining the amount of the carburating fraction substantially constant while varying the amount of the total fuel charge. Even if a decrease of the amount of the carburating fraction as a result of a decrease of the total fuel charge is accepted this arrangement cannot provide for a percent increase of the carburating fraction with respect to a total fuel charge of decreasing value.

Such a repartition of the fuel charge whereby the proportion of the carburating fraction increases with respect to a decreasing total fuel charge is of particular interest for operating engines of the type having a precombustion chamber.

As a matter of fact this type of engine is advantageously operated according to the double-injection method with a relatively low proportion of the carburating fraction (e.g. around 10% of the total fuel charge or less, where operated at full charge) whereas, on the contrary the engines operated by direct injection of the fuel into the cylinders require for achieving optimal results higher proportions of the carburating fraction (e.g. around 20–30% of the total fuel charge where operated at full charge). Where it is desired to operate an engine of the type having a pre-combustion chamber according to the double-injection method with relatively low amounts of the total fuel charge per work cycle, it may accordingly occur, at a reduced speed, that the amount of fuel delivered by the system for the first "carburating" portion is insufficient for actuating the nozzle, the engine being therefore operated according to the single-injection method at such low speeds.

Consequently this type of arrangement also results, in such cases, in an irregular distribution of the total fuel charge between the two injections of the cycle, in relation with the engine speed.

These disadvantages are overcome by the new and useful device according to the present invention which offers the same advantages as the last mentioned arrangement and particularly that of being adaptable to the conventional engines without requiring any substantial modification thereof and which do not suffer from the above-mentioned drawbacks of said arrangement.

It is therefore an object of the present invention to provide a simple apparatus by means of which a first "carburating" portion of the fuel charge is injected into the residual hot gases remaining in the combustion space of the cylinder toward the end of the exhaust stroke of a work cycle and the remainder of the fuel charge is injected toward the end of the compression stroke of the next work cycle.

It is another object of the invention to provide a simple apparatus by means of which the charge to be supplied to each cylinder is injected into the latter in two successive portions, the time interval between these two injections corresponding to a full revolution of the crankshaft (i.e. 360° C.) in the case of a four-stroke engine.

It is yet another object of this invention to provide means for adjusting at will the ratio of the two successive portions of the fuel charge to be fed to the same cylinder and thereby to obtain the highest efficiency of the double-injection method regardless of the kind of fuel used.

It is still another object of this invention to provide for two injections per work cycle into the cylinders of a compression-ignition engine having an even number of cylinders in such a manner that the ratio of the respective amounts of said two injections is kept substantially independent from the running speed of the engine.

It is a further object of this invention to provide a simple double-injection device whereby the distribution of the total charge per work-cycle between the two injections is not substantially modified as a result of a slight difference occurring between the respective operating pressures of the two associated injectors.

It is a still further object of this invention to provide a simple double-injection device whereby the distribution of the total charge per work-cycle in a carburating fraction and an igniting fraction is such that the amount of the carburating fraction may be kept substantially constant when the total charge is varied or decreases in a lower proportion than of the total charge percent decrease with respect to the full charge.

These and other objects as may be apparent from the following specification and claims are achieved by the device according to this invention which is essentially characterized in that each outlet port of the pump is connected to two delivery lines of substantially equal lengths simultaneously feeding the injectors of two cylinders of the engine wherein the pistons are at an interval of a half-cycle relative to each other, said two delivery lines comprising a main line as normally used in the conventional engines and an auxiliary line having a lower discharge rate, provided for conveyance of the carburating fraction.

These two lines may have a common portion at the outlet of the pump which will be designated hereinafter by "junction pipe to the pump" in order to distinguish the same specifically from the pipes feeding a single injector (main and auxiliary pipes respectively).

Similarly the main pipe associated to one outlet port of the pump and feeding an injector may have a portion in common with the auxiliary pipe associated to another outlet port and feeding the same injector, this common portion being designated hereinafter by the term "junction pipe to the injector." It has been observed that, when, according to the essential characteristic of this invention, the respective lengths of the main and auxiliary lines associated to the same outlet port of the pump are substantially equal, the ratio of the respective fuel amounts of the carburating fraction and the igniting fraction is substantially independent from the engine speed, whereby a regular operation of the latter is achieved.

Moreover the device according to this invention provides for a considerable reduction of the variations in the distribution of the total charge between the two injections per cycle resulting from a difference, even slight, between the respective operating pressures of the injectors fed by the associated pipes.

It may also be of advantage in some cases to provide an auxiliary pipe having a diameter different from that of the main pipe and for instance a larger diameter, with a discharge-reducing device.

It is thus possible by selecting the respective diameters of the main and auxiliary pipes and/or by selecting the discharge-reducing means of the auxiliary pipes, to vary the share of the total charge alloted to the carburating injection as a function of the amount of said total charge, in conformity with variation laws which may be selected at will, so that the device according to the invention may be adapted to a very wide variety of engines.

It must be emphasized that the present device may be used not only for carrying out the double-injection process as described in the U.S. Patent 2,960,079, but is also applicable for carrying out any process according to which two injections per cycle are effected in each cylinder at an interval of a half-cycle from each other.

The device according to this invnetion will be further described more in detail with reference to the accompanying drawing, given by way of non-limitative example and diagrammatically showing a specific arrangement complying with the above general description.

Figure 1:
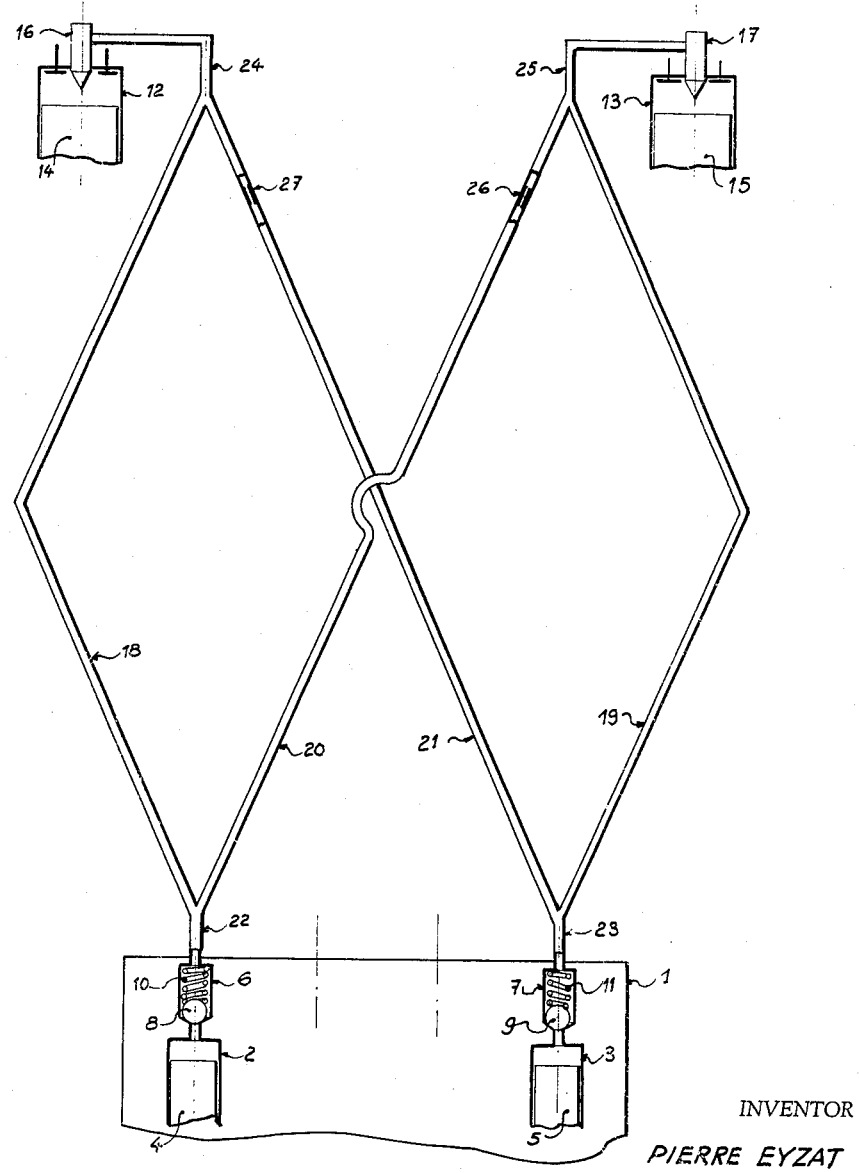
FIGURE 1 shows a preferred form of the invention wherein the main pipes and auxiliary lines connect the pump to the injectors of the cylinders.

The device illustrated in FIGURE 1 comprises a feeding pump 1 of usual type, for instance a conventional pump having cylinders, such as 2 and 3 containing pistons 4 and 5 movable therein. These cylinders are surmounted with valves of the conventional type 6 and 7 each comprising a ball 8 or 9 held by a spring 10 or 11.

The engine comprises an even number of cylinders such as for instance the cylinders 12 and 13 having movably mounted therein pistons 14 and 15. Injectors of the usual type emerge into these cylinders. Each valve is connected to the corresponding injector through a main pipe (18 or 19 respectively), a junction pipe to the pump (22 or 23) and a junction pipe to the injector (24 or 25), these various pipes all having in this case the same diameter. Auxiliary pipes 20 and 21 are also connected respectively to junction pipes to the pump 22 and 23 and to junction pipes 24 and 25 to the injectors, these various junction pipes being optionally as short as desired or even completely omitted in which case the connections are directly effected with the valves of the pump or the injectors.

Figure 2:
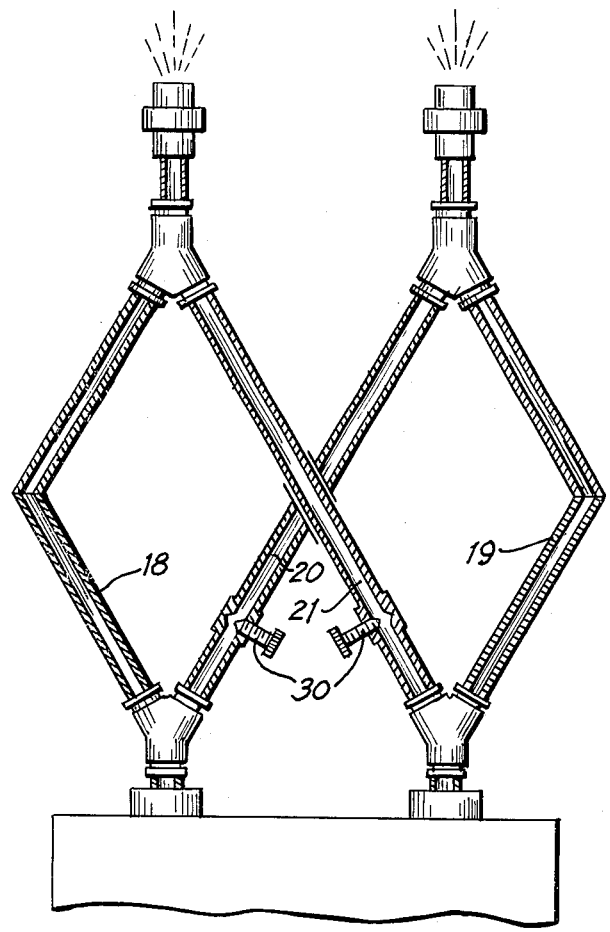
FIGURE 2 shows a modified form of the device of FIGURE 1, showing a discharge reducing means for the auxiliary lines.

The adjustment of the proportion of the carburating fraction with respect to the total charge may be effected as shown in FIGURE 2 either by selecting auxiliary lines of a diameter different from that of the main lines and/or preferably, by providing the auxiliary lines with discharge-reducing means 30 such as a section-limiting device either of invariable characteristics or of an adjustable type.

Calibrated holes 26 and 27 provide means for controlling the discharge rate through pipes 20 and 21. A number of tests which have been carried out by using the device according to this invention are described hereinafter.

*Test 1*

In this test there are used injectors calibrated for a pressure of 200 kg. per cm.$^2$, a cylinder-type pump and pipes having an internal diameter of 1.5 mm. These pipes are respectively of the following lengths:

Pipes 22, 23, 24, and 25: 5 cm. each.
Pipes 18, 19, 20, and 21: 60 cm. each.

Calibrated holes (26 and 27) of an internal diameter of 0.4 mm. are provided in each of the auxiliary pipes 20 and 21.

The results of the test show, as a function of the running speed of the pump V, expressed by the number of runs per minute, the respective weights of the carburating fraction and the igniting fraction, from which is deduced the percentage $P_1$ of the carburating fraction with respect to the total charge (sum of the carubrating fraction and the igniting fraction) having a constant value of 50 mg. per cycle, which corresponds to the full charge for the considered engine.

These results are given in the following table:

| V | 500 | 600 | 700 | 800 | 900 | 1,000 | 1,100 | 1,200 | 1,307 |
|---|---|---|---|---|---|---|---|---|---|
| $P_1$, percent | 19 | 21 | 23.4 | 24.1 | 20.5 | 23.9 | 23.5 | 24.8 | 18.0 |

It is apparent therefrom that the percentage of the total charge corresponding to the carburating fraction is substantially unaffected by the speed of the pump and consequently by the running speed of the engine.

Test 2

Test 1 is repeated except that the operating pressure of one of the injectors is adjusted to a value of 195 kg./cm.$^2$, whereas the operating pressure of the other injector is maintained at 200 kg./cm.$^2$, all of the other conditions being kept unchanged.

The percentages $P_2$ of the total charge which correspond to the carburating fraction are as follows:

| V | 500 | 600 | 700 | 800 | 900 | 1,000 | 1,100 | 1,200 | 1,300 |
|---|---|---|---|---|---|---|---|---|---|
| $P_2$, percent | 22.2 | 18.5 | 21.8 | 23.4 | 22 | 23.7 | 24.9 | 26.5 | 24.9 |

A comparison of $P_2$ with $P_1$ (Test 1) shows that a difference in the operating pressure of the two associated injectors does not result in a substantial change of the percentage of total charge allotted to the carburating fraction.

Test 3

This test has been conducted in order to illustrate, by comparison with the preceding results, the very high sensitivity to a difference of the respective operating pressures of the two injectors, of the double-injection system according to U.S. Patent 3,014,466.

This latter system comprises two delivery pipes of a 1.5 mm. internal diameter and a 50 cm. length each, interconnected through a junction pipe of equal diameter opening in each of said delivery pipes at a distance of 15 cm. from the corresponding outlet port of the pump and provided with a calibrated hole of 0.4 mm. diameter.

This system has been used for feeding two injectors a first one of which was calibrated for a pressure of 200 kg./cm.$^2$ and the second for a slightly different pressure.

At a running speed of the engine of 500 runs per minute the following results were obtained:

| Operating pressure of the second injector | Total charge in mg. per stroke of the piston of the pump ($Q_1+Q_2$) | Carburating fraction in mg. per stroke of the piston of the pump ($Q_1$) | Percent for the carburating fraction $\frac{Q_1}{Q_1+Q_2}$ |
|---|---|---|---|
| 195 | 58.0 | 18.3 | 31.5 |
| 200 | 49.2 | 12.6 | 25.6 |
| 205 | 40.0 | 3.5 | 9.0 |

These results show that a difference of ±2.5% between the respective operating pressures of the two injectors is sufficient to cause the amount of the carburating fraction to vary in proportion of the ratio 1:5.

On the contrary, as it is apparent from a comparison of the results of Tests 1 and 2, at the same speed of the engine of 500 r.p.m. and with a difference of 2.5% between the respective operating pressures of the two injectors, the device according to this invention provides means for maintaining substantially constant the percentage of the total charge corresponding to the carburating fraction (22.2% instead of 19%).

Test 4

The device used is the same as that described in Example 1 except that the auxiliary lines are selected of a 2 mm. diameter and the calibrated holes of a 0.5 mm. diameter. While maintaining the speed of the pump at 900 r.p.m., the discharge rate of the latter is varried. The percentage $P_1$ of the total charge alloted to the carburating fraction is given, in relation with the amount Q of said total charge (sum of the carburating and the igniting fractions) expressed in milligrams per stroke of the piston of the pump, in the following table:

| $P_1$ | 50.7 | 40.7 | 36.6 | 33.7 | 34.2 | 32 |
|---|---|---|---|---|---|---|
| Q | 12.45 | 18 | 27.3 | 36.2 | 48.7 | 54.2 |

It is apparent from these results that the proportion of the total charge alloted to the carburating fraction does not change much in relation with the discharge rate of the pump and accordingly with the amount of the total charge, except where the engine is operated at low charge, in which case a higher proportion for the carburating fraction is obtained. Such a type of distribution of the charge is of particular advantage in some cases such as when an engine of the type provided with a precombustion chamber is used.

Test 5

In this test there are used injectors calibrated for a pressure of 130 kg./cm.$^2$, a pump with cylinders and pipes having an internal diameter of 1.5 mm. with the exception of the auxiliary lines which are of a 2 mm. internal diameter.

The respective lengths of the various lines are the same as in the device used for Test 1. The calibrated holes, of a 0.4 mm. internal diameter are provided in the auxiliary pipes at a distance of 10 cm. from the respective ends thereof which are the closest to the pump.

While maintaining the speed of the pump to 1000 r.p.m. it has been possible to vary within a very wide range the amount Q of the total charge (expressed in milligrams per stroke of the piston) without substantial modification of the amount $Q_1$ of the carburating fraction (in milligrams per stroke of the piston), as shown by the following resuts:

| $Q_1$ | 8 | 8 | 8 | 7.5 | 7.0 |
|---|---|---|---|---|---|
| Q | 65 | 57.5 | 47 | 33 | 28 |
| $Q_1/Q$, percent | 13 | 13.9 | 17 | 22 | 25 |

As already stated this possibility of maintaining substantially constant the amount of the carburating fraction is of particular interest for operating engines provided with a precombustion chamber the operation of which according to the double-injection method is optimal with the use of a relatively small amount of the carburating fraction as compared to the total fuel charge.

Test 6

In this test, conducted for purpose of comparison, the device used is the same as that described in connection with Test 3, the injectors being calibrated for a pressure of 200 kg./cm.$^2$ and the pump maintained at a speed of 1000 r.p.m.

As it is apparent from the following results, such a device does not provide means, while varying the amount Q of the total fuel charge, for maintaining at a substantially constant level the amount $Q_1$ of the carburating fraction or even for varying the latter in a lower proportion than the total charge (i.e. for increasing the ratio $Q_1/Q$ with decreasing values of Q).

These results are summarized below:

| $Q_1$ (mg. per stroke) | 16.2 | 11.2 | 9.8 | 4.2 |
|---|---|---|---|---|
| Q (mg. per stroke) | 56.7 | 47.5 | 40 | 21 |
| $Q_1/Q$, percent | 28.5 | 23.6 | 24.5 | 20 |

A comparison of the respective results obtained with Tests 5 and 6 makes clear the advantages of the device according to this invention as compared to the device described in the U.S. Patent 3,014,466, which advantage is particularly important in the case of engines having a precombustion chamber.

It will be understood that this invention is susceptible to further modification and, accordingly, it is desired to comprehend such modifications within this invention as may fall within the scope of the appended claims.

What is claimed as this invention is:

1. A device for injecting fuel in compression-ignition engines having an even number of cylinders and comprising an injection pump having a number of outlet ports fed in successive order, at least one injector per cylinder and main pipes connecting each outlet port of the pump to each corresponding injector, wherein each outlet port of the pump is further connected to an auxiliary line feeding one injector of a cylinder wherein the piston is operated at a half-cycle interval from the work cycle in the cylinder fed by the main pipe connected to said outlet port, said auxiliary line being of substantially the same length as the main pipe connected to the same outlet port of the pump.

2. A device according to claim 1, wherein said auxiliary lines are provided with discharge-reducing means.

3. A device according to claim 1, wherein the main and the auxiliary pipes fed from the same outlet port of the pump are connected to the latter through a common junction pipe.

4. A device according to claim 1, wherein the main and the auxiliary pipes feeding the same injector are connected to the latter through a common junction pipe.

5. A device according to claim 1, wherein the main and the auxiliary pipes fed from the same outlet port of the pump are of different diameters.

6. A device according to claim 1, wherein the discharge-reducing means provided in the auxiliary pipes consist of section-limiting devices.

References Cited by the Examiner
UNITED STATES PATENTS
3,014,466   12/61   Monnot et al. _____ 123—32

MARK NEWMAN, *Primary Examiner.*

RICHARD B. WILKINSON, *Examiner.*